United States Patent
Nishimoto et al.

(10) Patent No.: US 8,261,685 B2
(45) Date of Patent: Sep. 11, 2012

(54) HORN GUARD DEVICE FOR MOTORCYCLE

(75) Inventors: Osamu Nishimoto, Saitama (JP);
Takamasa Nagumo, Saitama (JP);
Nobutaka Tokumasu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 12/561,784

(22) Filed: Sep. 17, 2009

(65) Prior Publication Data

US 2010/0101482 A1    Apr. 29, 2010

(30) Foreign Application Priority Data

Oct. 24, 2008 (JP) ................. 2008-274296

(51) Int. Cl.
*G01K 5/00* (2006.01)

(52) U.S. Cl. ............... 116/59; 116/137 R; 181/193

(58) Field of Classification Search .......... 116/59, 116/137 R, 3; 181/179, 191–193, 195, 198; 381/340; 123/184.55; 340/404.1, 384.1; 248/300; D12/196
See application file for complete search history.

(56) References Cited

U.S. PATENT DOCUMENTS

| | | | | |
|---|---|---|---|---|
| 1,391,688 A | * | 9/1921 | Marsico ............... | 248/300 |
| 4,020,914 A | * | 5/1977 | Trautwein ............ | 180/210 |
| 4,509,613 A | * | 4/1985 | Yamaguchi ........... | 180/219 |
| D294,922 S | * | 3/1988 | Nagy ................... | D12/126 |
| 4,759,320 A | * | 7/1988 | Fujii et al. ........... | 123/184.55 |
| 5,661,999 A | * | 9/1997 | Carone ................ | 74/473.16 |
| 6,276,481 B1 | * | 8/2001 | Matsuto et al. ....... | 180/220 |
| 6,294,984 B1 | * | 9/2001 | Meister ............... | 340/404.1 |
| 7,503,415 B2 | * | 3/2009 | Hasegawa et al. .... | 180/228 |
| 7,617,794 B2 | * | 11/2009 | Chlystek .............. | 116/137 R |
| 7,793,748 B2 | * | 9/2010 | Takahashi et al. .... | 180/219 |
| D626,894 S | * | 11/2010 | Holcomb .............. | D12/126 |
| 8,083,017 B2 | * | 12/2011 | Arimura .............. | 180/219 |

FOREIGN PATENT DOCUMENTS

| JP | 62-83264 A | 4/1987 |
|---|---|---|
| JP | 9-11966 A | 1/1997 |
| JP | 11-91665 A | 4/1999 |

\* cited by examiner

*Primary Examiner* — R. A. Smith
*Assistant Examiner* — Tania Courson
(74) *Attorney, Agent, or Firm* — Birch, Stewart, Kolasch & Birch, LLP

(57) ABSTRACT

A horn guard device for a motorcycle having an aesthetic appearance improved and being capable of meeting legally-specified values for a horn sound pressure in different countries. A spiral-type horn is attached onto a down tube with its sound-pressure outlet facing the road surface. The horn is placed downward of an engine. A water-exposure guard is provided facing a front portion of the sound-pressure outlet. The water-exposure guard faces the sound-pressure outlet with a predetermined angle therebetween. The water-exposure guard can be integrally formed on a lower portion of a bracket attached to bosses extending to the side from the down tube.

8 Claims, 5 Drawing Sheets

US 8,261,685 B2

HORN GUARD DEVICE FOR MOTORCYCLE

CROSS-REFERENCE TO RELATED APPLICATIONS

The present application claims priority under 35 USC 119 to Japanese Patent Application No. 2008-274296 filed on Oct. 24, 2008 the entire contents of which are hereby incorporated by reference.

BACKGROUND OF THE INVENTION

1. Field of the Field

The present invention relates to a horn guard device for a motorcycle. More particularly, to a horn guard device for a motorcycle capable of guarding a horn mounted on the motorcycle from water exposure and for obtaining a predetermined sound pressure.

2. Description of Background Art

A motorcycle is known that is provided with a horn as a safety device. Japanese Patent Application Publication No. Hei 9-11966 and Japanese Patent Application Publication No. Sho 62-83264 each disclose a scooter-type motorcycle in which a horn is placed at a position being downward of an inner cover in a front cover and facing a traveling air inlet opening. In addition, Japanese Patent Application Publication No. Hei 11-91665 discloses a scooter-type motorcycle in which a horn is placed, facing frontward, in a tunnel portion provided in a main frame, and is supported by a reinforcement member which is attached in the tunnel portion while extending in the vehicle-body width direction.

All of the motorcycles disclosed in Japanese Patent Application Publication No. Hei 9-11966; Japanese Patent Application Publication No. Sho 62-83264 and Japanese Patent Application Publication No. Hei 11-91665 are of a scooter type in which a portion frontward of the rider's seat is covered with a vehicle-body cover. More specifically, in the motorcycles disclosed in Japanese Patent Application Publication No. Hei 9-11966 and Japanese Patent Application Publication No. Sho 62-83264, water exposure of the horn is not really a problem to be concerned with since the horn is placed inside the vehicle cover. On the other hand, in the motorcycle disclosed in Japanese Patent Application Publication No. Hei 11-91665, the horn is attached to a lower portion of the main frame. For this reason, although there is little chance that the horn is exposed to water coming from above, there is a chance for exposure to water or mud splashed up by the front wheel.

Moreover, in the motorcycles disclosed in Japanese Patent Application Publication No. Hei 9-11966; Japanese Patent Application Publication No. Sho 62-83264 and Japanese Patent Application Publication No. Hei 11-91665, since the horn is covered with the vehicle-body cover, sound is easily muffled, making it difficult to obtain a predetermined sound pressure. In addition, a legally-specified value for the sound pressure is often different from country to country. For this reason, the specification of the horn has to be adjusted according to the value legally-specified in the country where the horn is to be used.

In a case of a non-scooter-type motorcycle having many portions not covered with the vehicle-body cover, the horn is bare and is therefore easily exposed to water. In addition, an aesthetic appearance cannot be obtained in some cases. Moreover, when the horn is placed in a lower area of the vehicle body, water or mud splashed up by the front wheel might enter the horn having a spiral shape from its sound-pressure outlet. This possibly would muffle the sound.

SUMMARY AND OBJECTS OF THE INVENTION

An objective of an embodiment of the present invention is to provide a horn guard device for a motorcycle which allows less water or mud to enter the horn, offers a good appearance, and can meet legally-specified values for a horn sound pressure in different countries.

To attain the above objective, an embodiment of the present invention provides a horn guard device for a motorcycle, provided for a horn placed downward of an engine and onto a vehicle body frame. The horn is of a spiral type and is placed to have a sound-pressure outlet facing a road surface, and the horn guard device for a motorcycle includes a water-exposure guard facing an almost front half of the sound-pressure outlet with a predetermined space in between.

In addition, in an embodiment of the present invention, the horn guard device for a motorcycle includes a cover plate placed facing a side face of the horn from an outer side in a vehicle-body width direction; a horizontal member provided to project from the vehicle body frame outward in the vehicle-body width direction, and linked, at an end portion thereof, to the cover plate; and a bracket extending vertically, being provided, at a tip thereof, with the water-exposure guard, and being joined to the horizontal members. The bracket holds the horn with an attachment member.

In addition, in an embodiment of the present invention, the horizontal member is formed of two bosses and cylinder-shaped collars. The bosses are welded to a down tube forming the vehicle body frame with the collars being fastened to end portions of the respective two bosses with bolts inserted therethrough in an axial direction. The bracket and the cover plate are placed with a predetermined distance determined in between by the collars, and the horn is placed in a space having the predetermined distance.

In addition, in an embodiment of the present invention, the water-exposure guard is formed of a planar plate, and the water-exposure guard and the horn are arranged at such a predetermined angle α therebetween that a distance between a plane of the water-exposure guard and a sound-pressure-outlet plane including an edge of the sound-pressure outlet is large at a rear of the vehicle body and is small at a front of the vehicle body.

In addition, in an embodiment of the present invention, the cover plate supports a rider's footrest and a shift pedal.

According to an embodiment of the present invention, the horn is placed downward, namely, placed with its sound-pressure outlet facing the road surface. Accordingly, sound emitted from the horn reflects off the road surface, and thereby a predetermined sound pressure can be obtained. In addition, although there is a possibility that the horn provided downward of the engine is exposed to water or mud splashed up by the front wheel, the water-exposure guard can prevent the water or mud from entering the inside of the horn from the sound-pressure outlet. This can prevent possible muffling of the sound caused by entered water.

According to an embodiment of the present invention, the cover plate covers the outside portion of the horn. Accordingly, good appearance can be attained, unlike a case where the horn is mounted bare.

According to an embodiment of the present invention, the horn is placed in the space surrounded by the collars, the cover plate, and the bracket. Accordingly, the horn can be easily protected from not only the water exposure, but also an external force.

According to an embodiment of the present invention, the sound pressure can be adjusted according to the angle α between the plane of the water-exposure guard and the plane of the sound-pressure outlet. Accordingly, the horn guard device can support legally-specified sound pressures in different countries, not by changing the specification of the horn, but by selecting the bracket having the angle appropriately set.

According to an embodiment of the present invention, the cover plate can also serve as a member to which the shift pedal and a footrest (step) are attached.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
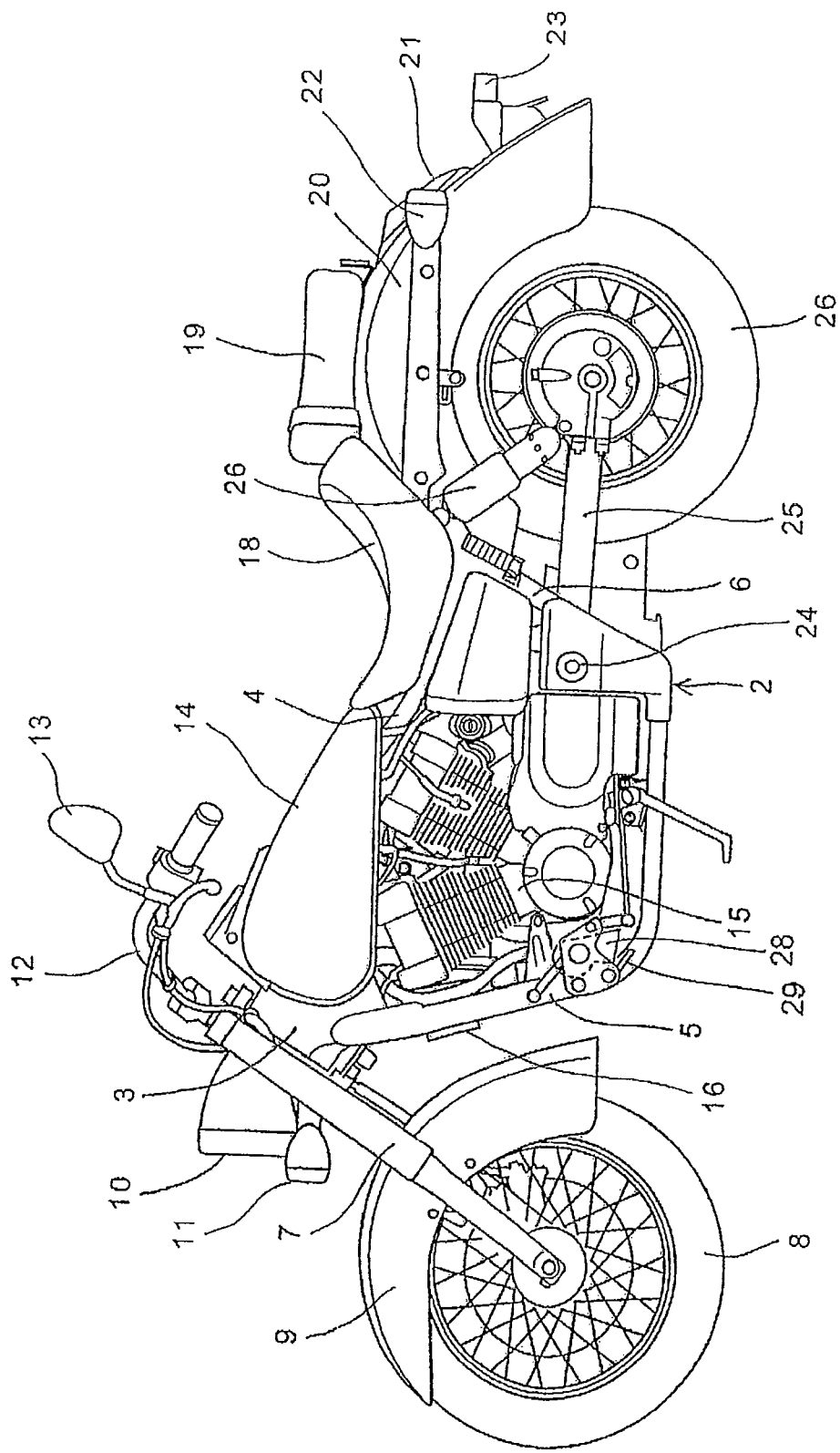
FIG. 1 is a left-side view of a V-type-engine-equipped motorcycle including a horn guard device according to an embodiment of the present invention.

An embodiment of the present invention is described below with reference to the drawings. FIG. 1 is a left-side view of a V-type-engine-equipped motorcycle including a horn guard device according to the embodiment of the present invention. In FIG. 1, a motorcycle 1 includes a vehicle-body frame 2 of a so-called double-cradle type. The vehicle-body frame 2 includes a head pipe, which is not illustrated; a bracket 3 welded, at its front end, to the rear of the head pipe; a pair of left and right main frames 4 each welded, at its front end, to the bracket 3; a pair of left and right down tubes 5 each welded, at its upper end, to a lower portion of the bracket 3; and a center frame 6 linking the down tubes 5 to the respective main frames 4.

A front fork 7 is linked to the head pipe while being allowed to move rotationally. A front wheel 8 is rotatably supported at a lower end portion of the front fork 7. Further, a front fender 9 is placed above the front wheel 8 and is supported by the front fork 7.

A headlight 10 is attached to a front portion of the head pipe. A pair of left and right front turn signals 11 are attached to a middle portion of the front fork 7. A steering handle 12 is attached to an upper portion of the front fork 7. A pair of left and right rearview mirrors 13 are attached to the steering handle 12.

A fuel tank 14 is placed above the main frames 4. A water-cooled, V-type two-cylinder engine 15 is installed in a space surrounded by the main frames 4 and the down tubes 5. The engine 15 is supported by the down tubes 5. A radiator 16 is installed in front of the engine 15 by being attached to front faces of the down tubes 5. The engine 15 can be cooled by circulation of a coolant between the radiator 16 and the engine 15.

A front seat 18 is mounted rearward of the fuel tank 14 provided above the engine 15. A rear seat 19 is mounted rearward of the front seat 18. A rear fender 20 is attached downward of the rear seat 19. A stop lamp 21, a pair of left and right rear turn signals 22, and a license plate light 23 are attached to the rear fender 20.

Moreover, a pivot shaft 24 is placed extending laterally (horizontally) near a lower portion of the center frame 6 of the vehicle-body frame 2. A hollow swing arm (rear fork) 25 is swingably supported to the pivot shaft 24. A rear shock absorber 26 is attached above the swing arm 25 in such a manner as to link the body frame 2 to a rear end portion of the swing arm 25. Below the rear fender 20, a rear wheel 26 is rotatably supported to a rear end portion of the swing arm 25. A propeller shaft is rotatably provided in the swing arm 25, and transmits power of the engine 15 to the rear wheel 26.

A horn 28 is attached to one of the down tubes 5. The horn 28 is a spiral-type horn, and is attached in such a manner that its sound-pressure outlet faces downward against the road surface. The horn 28 is easily exposed to water splashed up by the front wheel 8. Accordingly, a plate (water-exposure guard) 29 for water exposure protection is provided to guard especially the sound outlet from water exposure. The water-exposure guard 29 is attached to the down tube 5 via bosses extending from the down tube 5 outward in the vehicle-body width direction (a detailed description of the bosses will be given later by referring to FIGS. 2 to 6).

Figure 6:
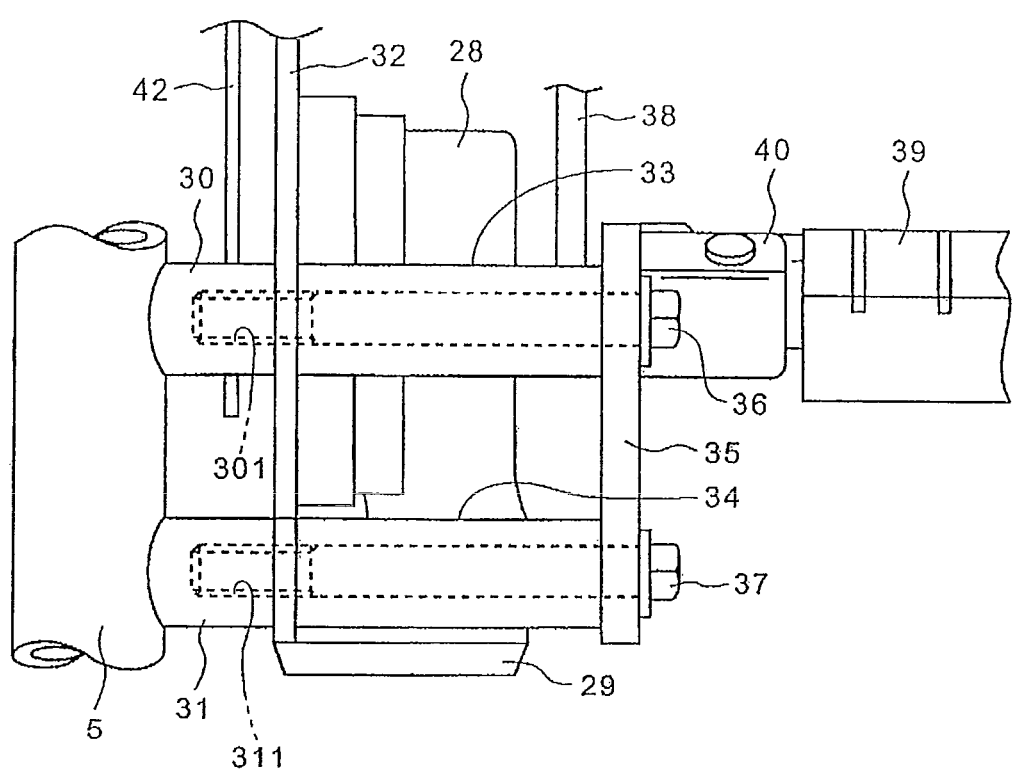
FIG. 6 is a view showing the horn attachment portion seen from the front of the vehicle body.

With reference to FIGS. 2 to 6, a detailed description will be given of the embodiment of the horn and the horn guard device. As illustrated in FIG. 6, bosses 30 and 31 protrude from the down tube 5 at respective two locations. The horn and a horn guide device are attached to the down tube 5 by means of the bosses 30 and 31. Female screws 301 and 311 are formed in respective end portions of the bosses 30 and 31. Each of bolts 36 and 37 penetrates a bracket 32, a corresponding one of cylinder-shaped collars 33 and 34, and a cover plate 35, and are screwed to the female screws 301 and 311. The bracket 32, the collars 33 and 34, and the cover plate 35 are integrally attached to form the horn guard device.

Figure 2:
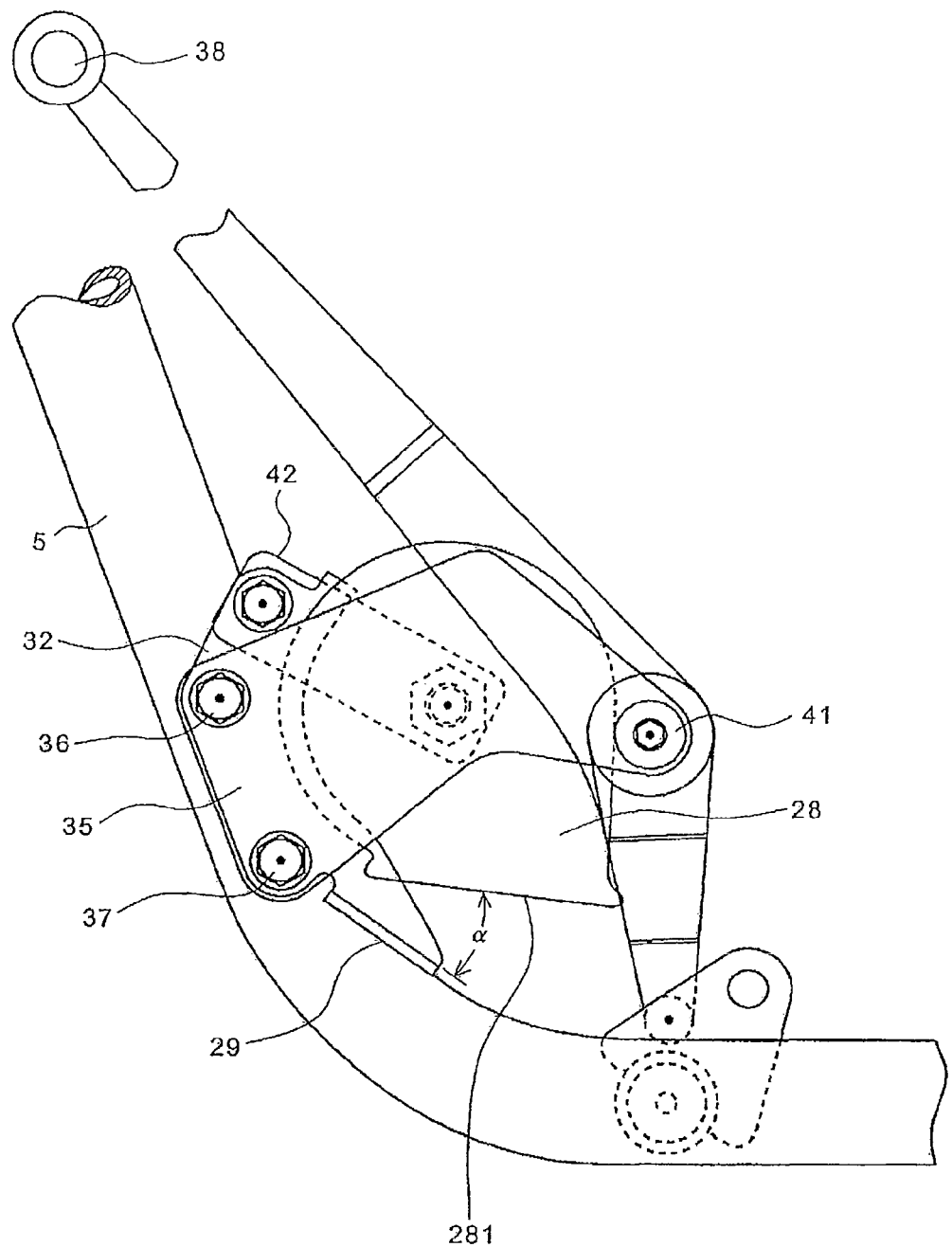
FIG. 2 is a chief-portion side view of the motorcycle, showing a horn attachment portion.
Figure 3:
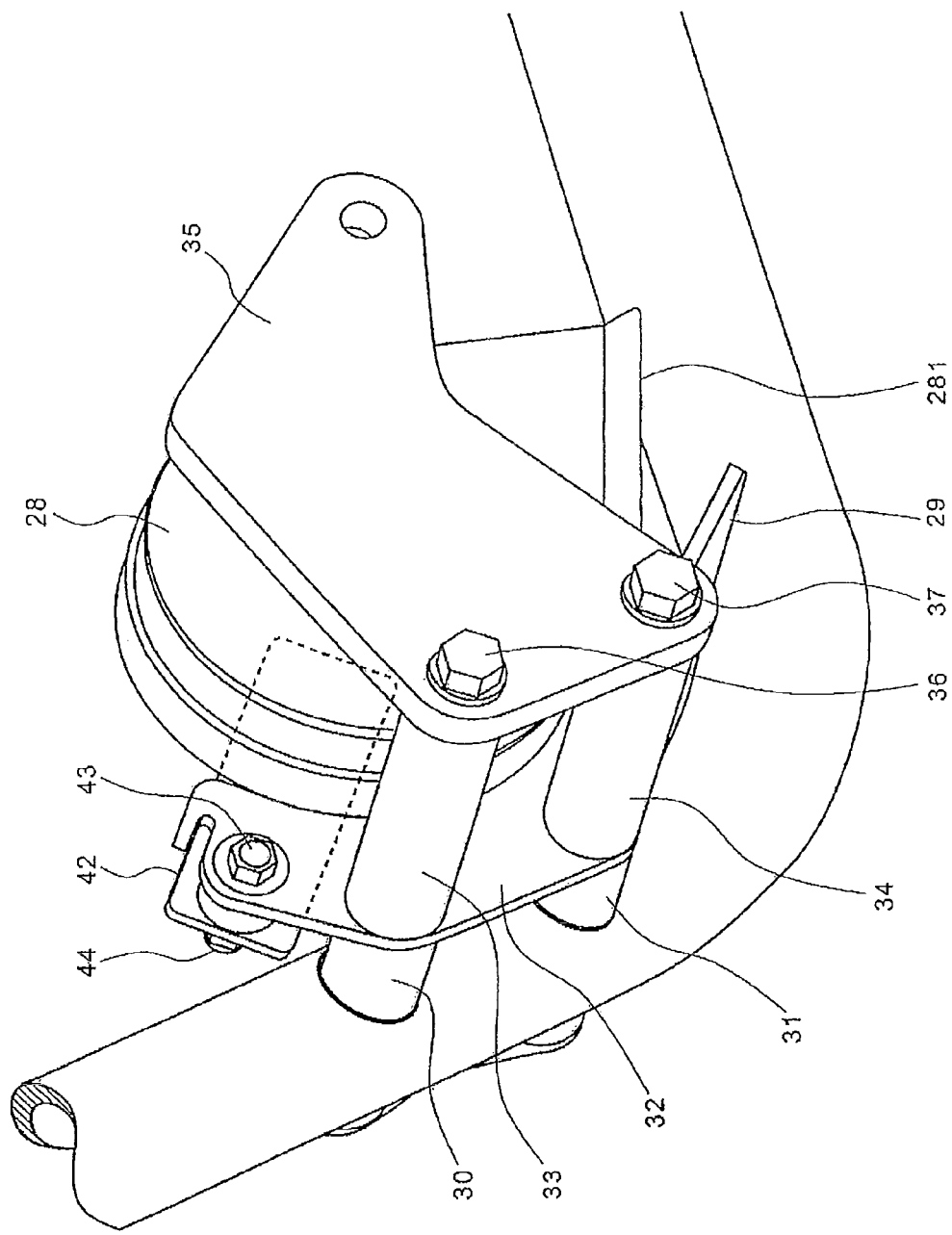
FIG. 3 is a perspective view showing the horn attachment portion seen from the left front.
Figure 4:
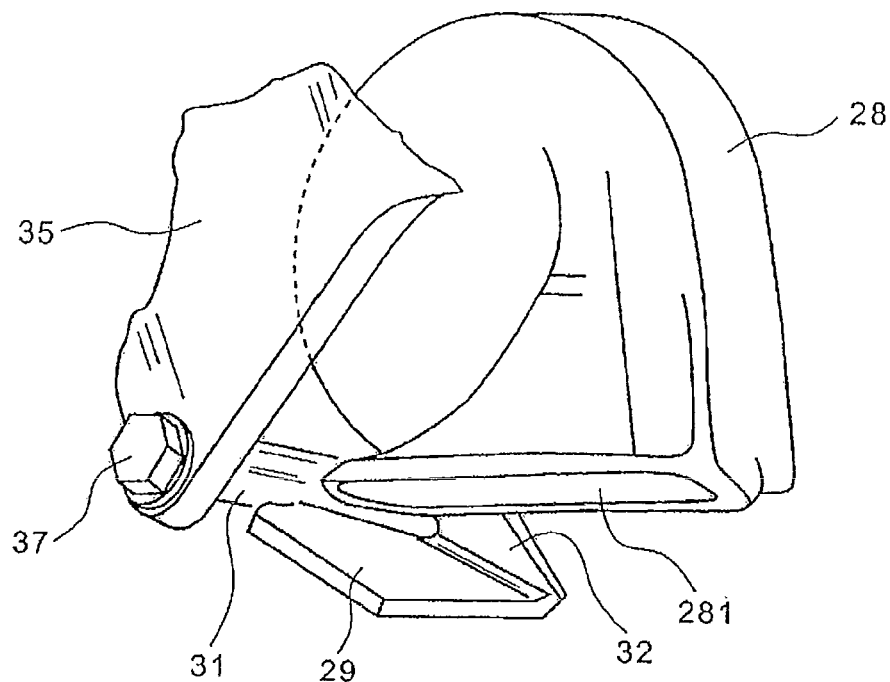
FIG. 4 is a perspective view seen from the lower left rear.
Figure 5:
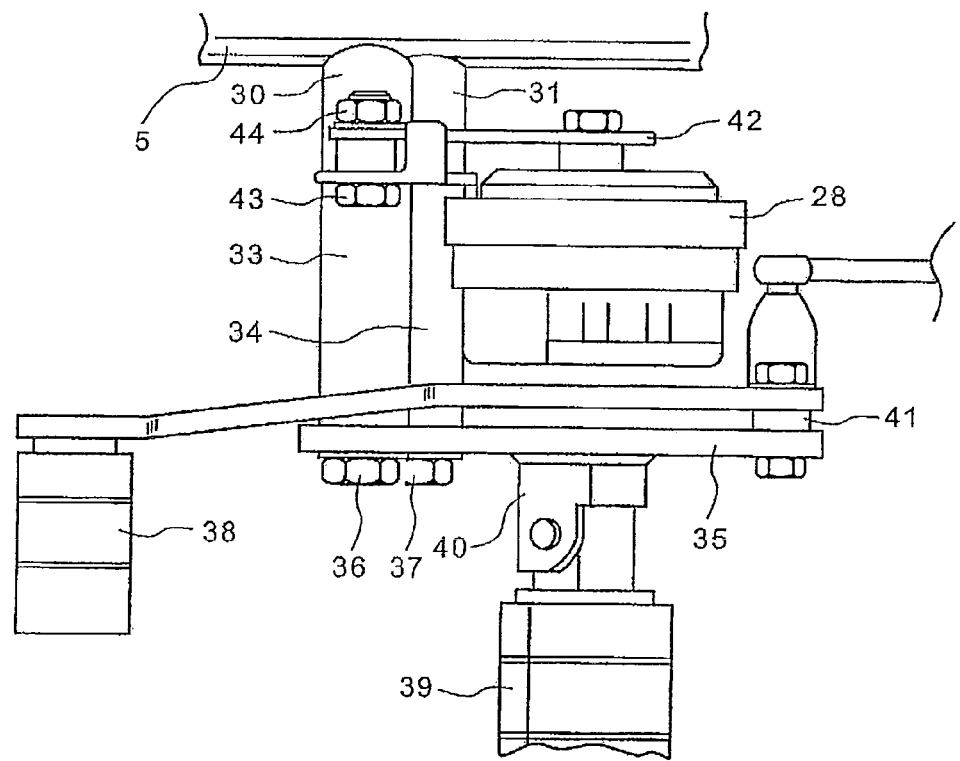
FIG. 5 is a top view of the horn attachment portion.

The bracket 32 is a holding member that fixes the horn 28 to the bosses 30 and 31 by means of an attachment plate 42. In addition, as shown in FIGS. 2, 6 and others, the bracket 32 is also a member to which the water-exposure guard 29 is formed. The water-exposure guard 29 extends from a lower end of the bracket 32.

The bracket 32 is attached to the bosses 30 and 31 on distal ends thereof in such a manner that a portion serving as the water-exposure guard 29 is placed downward. The cover plate 35 is provided spaced away from the bosses 30 and 31 with the collars 33 and 34 in between. The cover plate 35 is a member serving multiple functions covering the side of the horn 28, pivotally supporting a shift pedal 38 (see FIGS. 2 and 5), and holding a rider's footrest (left step) 39 provided on the left of the vehicle body.

A stay 40 is welded to the cover plate 35, and the left step 39 is attached to the stay 40. Moreover, a shaft 41 is provided to a rear portion (the right hand in FIG. 2) of the cover plate 35, and pivotally supports the shift pedal 38. The shift pedal 38 pivotally supported by the shaft 41 extends between the cover plate 35 and the horn 28 and to the front of the vehicle body.

The attachment plate 42 for the horn 28 is fixed, at one end, to the horn 28, and is linked, at the other end, to the bracket 32 with a bolt 43 and a nut 44. The water-exposure guard 29 formed to a lower end of the bracket 32 extends horizontally outward in the vehicle-body width direction from the bracket 32 extending almost vertically. The water-exposure guard 29 is placed facing an almost front half of a sound-pressure outlet 281 of the horn 28. Note that there is a larger space between a rear portion 291 of the water-exposure guard 29 and the sound-pressure outlet 281. In other words, the sound-pressure outlet 281 and the water-exposure guard 29 are placed so as to have a predetermined angle α between a plane including an edge of the sound-pressure outlet 281 and a plane of the water-exposure guard 29.

Employment of the water-exposure guard 29 having the angle α appropriately changed allows a change in a state where the water-exposure guard 29 cuts off sound emitted from the sound-pressure outlet 281. Thereby, a predetermined sound pressure can be obtained. Accordingly, by changing the shape of the bracket 32 having the water-exposure guard 29 as its portion, the horn guard device can be adjusted to legally-specified sound pressures in different countries.

The horn guard device is assembled as follows. First, each of the bolts 36 and 37 is inserted through the cover plate 35, a corresponding one of the collars 33 and 34, and the bracket 32, in this order. Then, the bolts 36 and 37 are tightly screwed into the female screws 301 and 311 formed in the end portions of the bosses 30 and 31, respectively. Thereby, the cover plate 35, the collars 33 and 34, and the bracket 32 are integrally attached to the down tube 5.

Next, the shift pedal 38 is attached to the cover plate 35. Lastly, the horn 28 is tightly fixed to the bracket 32 by joining the attachment plate 42 for the horn 28 to the bracket 32 with the bolt 43 and the nut 44.

Note that the horn 28 may be joined to the bracket 32 beforehand, and that the shift pedal 38 too may be linked to the cover plate 35 beforehand.

The horn 28 and the water-exposure guard 29 thus assembled function as follows. Since the sound-pressure outlet 281 of the horn 28 faces almost downward, sound emitted from the horn reflects off the road surface. Accordingly, a necessary sound pressure can be obtained. Further, the water-exposure guard 29 makes it difficult for water or mud splashed up by the front wheel 8 to enter the sound-pressure outlet 281 of the horn 28. This prevents the horn sound from being muffled by the entered water.

Moreover, the sound pressure of sound emitted from the sound-pressure outlet 281 can be adjusted by changing the positional relationship between the water-exposure guard 29 and the sound-pressure outlet 281 of the horn 28. Accordingly, the horn guard device is adjustable to legally-specified sound pressure values different in many countries, not by changing the specification of the horn 28 itself, but by determining the specification of the bracket 32 including the water-exposure guard 29 according to the country where the device is to be used.

In the present embodiment, the shift pedal 38 and the left step 39 can be attached to the cover plate 35. Thus, the cover plate 35 serves both as a cover member for the horn 28 and as a holding member for the shift pedal 38 and the like. However, the present invention is not limited to such, and the shift pedal 38 and the left step 39 may be attached to the vehicle body with a member other than the cover plate 35.

In the configuration described above, pairs of the collars and the bolts are used as means for holding the cover plate 35 and the bracket 32. More specifically, the collars are joined to the respective bosses of the down tube by the bolts. However, the present invention is not limited to such a configuration. There is no limitation as long as the cover plate is placed on the outer side of the horn, and a plate member serving as the water-exposure guard is placed facing the front portion of the sound-pressure outlet, of the horn, placed downward.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A horn guard device for a motorcycle, comprising:
a horn being mounted on a vehicle body frame below an engine, said horn being a spiral type horn with a sound-pressure outlet facing downwards towards a road surface;
a water-exposure guard facing approximately a front half of the sound-pressure outlet with a predetermined space in between;
a cover plate facing a side face of the horn from an outer side in a vehicle-body width direction, wherein the cover plate supports a rider's footrest and a shift pedal;
a horizontal member projecting from the vehicle body frame outward in the vehicle-body width direction, and linked, at an end portion thereof, to the cover plate;
a bracket extending vertically, said water-exposure guard being secured to a tip of the bracket, said bracket being joined to the horizontal member; and
an attachment member being secured to the bracket for mounting the horn.

2. The horn guard device for a motorcycle according to claim 1, wherein
the horizontal member is formed of two bosses and cylinder-shaped collars, the bosses being welded to a down tube forming the vehicle body frame, the collars being fastened to end portions of the respective two bosses with bolts inserted therethrough in an axial direction,
said bracket and said cover plate being mounted on the collars with a predetermined distance in between, and
said horn being mounted in a space having the predetermined distance.

3. The horn guard device for a motorcycle according to claim 2, wherein
the water-exposure guard is formed of a planar plate, and
the water-exposure guard and the horn are arranged at such a predetermined angle α therebetween that a distance between a plane of the water-exposure guard and a sound-pressure-outlet plane including an edge of the sound-pressure outlet is large at a rear of the vehicle body and is small at a front of the vehicle body.

4. The horn guard device for a motorcycle according to claim 1, wherein
the water-exposure guard is formed of a planar plate, and
the water-exposure guard and the horn are arranged at such a predetermined angle α therebetween that a distance between a plane of the water-exposure guard and a sound-pressure-outlet plane including an edge of the sound-pressure outlet is large at a rear of the vehicle body and is small at a front of the vehicle body.

5. A horn guard device for a motorcycle, comprising:
a horn adapted to be mounted on a vehicle body frame, said horn being a spiral type horn including a sound-pressure outlet having a front half and a rear half;
a water-exposure guard operatively mounted relative to approximately the front half of the sound-pressure outlet with at an angle with a predetermined space being formed between the water-exposure guard and the sound-pressure outlet;
a cover plate facing a side face of the horn from an outer side in a vehicle-body width direction, wherein the cover plate supports a rider's footrest and a shift pedal;
a horizontal member projecting from the vehicle body frame outward in the vehicle-body width direction, said horizontal member being secured at an end portion thereof to the cover plate;
a bracket extending vertically, said water-exposure guard being secured to a tip of the bracket and said bracket being joined to the horizontal member; and
an attachment member being secured to the bracket for mounting the horn.

6. The horn guard device for a motorcycle according to claim 5, wherein
the horizontal member includes two bosses and two cylinder-shaped collars, the bosses being welded to a down tube forming the vehicle body frame, the collars being fastened to end portions of the respective two bosses with bolts inserted therethrough in an axial direction,
said bracket and said cover plate being mounted on the collars with a predetermined distance in between, and
said horn being mounted in a space having the predetermined distance.

7. The horn guard device for a motorcycle according to claim 6, wherein
the water-exposure guard is formed of a planar plate, and
the water-exposure guard and the horn are arranged at such a predetermined angle α therebetween that a distance between a plane of the water-exposure guard and a sound-pressure-outlet plane including an edge of the sound-pressure outlet is large at a rear of the vehicle body and is small at a front of the vehicle body.

8. The horn guard device for a motorcycle according to claim 5, wherein
the water-exposure guard is formed of a planar plate, and
the water-exposure guard and the horn are arranged at such a predetermined angle α therebetween that a distance between a plane of the water-exposure guard and a sound-pressure-outlet plane including an edge of the sound-pressure outlet is large at a rear of the vehicle body and is small at a front of the vehicle body.

* * * * *